May 26, 1931. W. F. BROWN 1,806,931
HEADLIGHT INDICATING DEVICE
Filed June 20, 1929
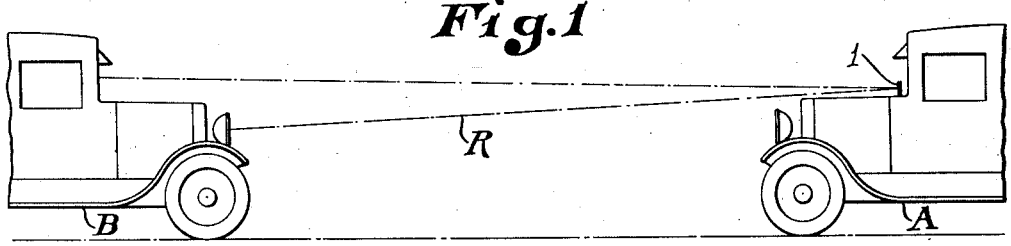
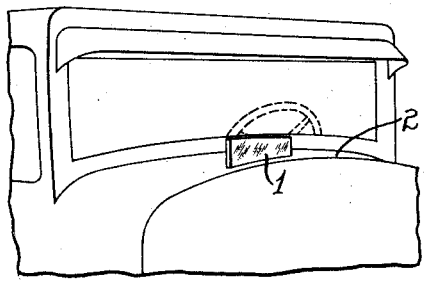
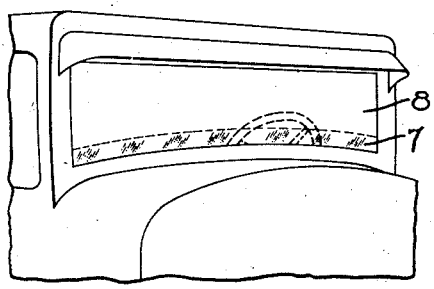
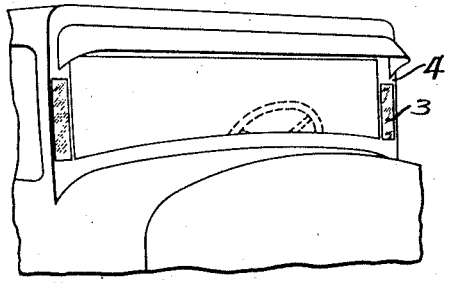
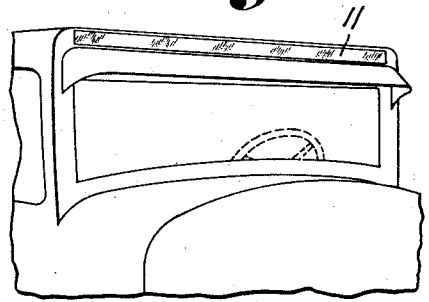
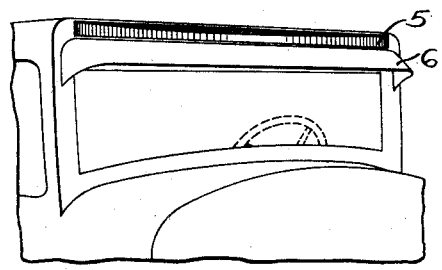
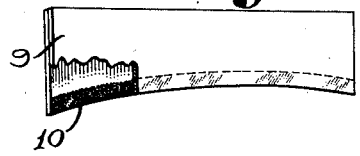
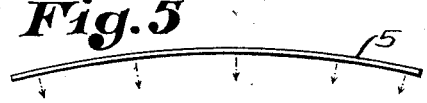
Inventor
Wilbur F. Brown
By
Owen & Owen
Attorneys Patented May 26, 1931

1,806,931

UNITED STATES PATENT OFFICE

WILBUR F. BROWN, OF TOLEDO, OHIO

HEADLIGHT INDICATING DEVICE

Application filed June 20, 1929. Serial No. 372,312.

This invention relates to vehicles, particularly automobiles, and an object is to indicate to a driver that the rays from his headlights are being directed into the eyes of the driver of an oncoming vehicle, thereby to stimulate the dimming of his lights, or otherwise remedying the trouble. Other objects and advantages will hereinafter appear.

Night driving is often dangerous because of the blinding lights from oncoming vehicles, often causing accidents from loss of control of the automobile, and other obvious reasons. This invention overcomes the difficulties heretofore experienced by directing back into the eyes of the driver the light rays from his headlights, thus stimulating, if not compelling, him to remedy the source of annoyance. In one aspect, the invention is of value in cautioning a motorist that one or both lights are improperly focused or exceeding the legal height of rays, it being well known that most States require that the headlight rays shall not exceed about forty-two inches. In this way the motorist is automatically warned that his lights are causing discomfort to other vehicle drivers, and the warning is of such nature as to compel action, because of the fact that the same discomfiture and annoyance is imparted to him.

By way of illustration, but not of limitation, the invention is shown on the accompanying drawings, in which:

Figure 1 is a side elevation of two approaching automobiles indicating the manner in which the rays are reflected or returned to the driver;

Figure 2 is a perspective view of a portion of an automobile with a reflector mounted on the cowl;

Figure 3 is a view similar to Fig. 2 showing reflectors mounted on posts at the sides of the windshield;

Figure 4 is another view similar to Fig. 2 showing a concave reflector positioned above the windshield visor;

Figure 5 is an edge view of the reflector shown in Fig. 4;

Figure 6 is another view similar to Fig. 2 showing the reflector formed in the lower portion of the windshield;

Figure 7 is a perspective view of a duplex windshield of the non-shattering type provided with a reflector between laminations; and Figure 8 is still another view similar to Fig. 2 showing a reflector positioned above the windshield visor, and differing from Fig. 4 in that a straight reflector is shown.

Referring to the drawings, Fig. 1 shows two approaching vehicles A and B, and the vehicle A is equipped with a reflector 1 mounted in upright position on the cowl 2 (Fig. 2). The reflector 1 is positioned at such an angle that the rays R from the headlights of the vehicle B are returned to the driver of that vehicle. It is manifest that only such rays are returned by the reflector as would be annoying and troublesome to the driver of the vehicle A. In this manner, the driver of vehicle B is automatically and instantly informed that the rays from one or both of his headlights are being directed into the eyes of the other driver, and he will be prompted to dim his lights in order to eliminate the glare which is being directed into his own eyes.

Although the reflector 1 is shown relatively small, it will be apparent that it may extend from side to side of the vehicle, as desired. The reflecting surface may be formed from any suitable material, such as from metal, glass (ordinary mirror), etc. If the reflector is of glass, the reflecting surface may be of any metallic deposit which gives the desired surface, or it may be "half silvered" to give any desired percent reflection.

It is apparent that the reflector may assume a number of different positions without in any way militating against the desired result. For example, reflectors 3 may be mounted on posts 4 at opposite sides of the windshield (Fig. 3). The reflectors are positioned at the proper angle for the purpose, and, manifestly, do not detract from the aesthetic appearance of the vehicle, but on the contrary, tend to enhance its appearance.

As shown in Figs. 4 and 5, a reflecting surface 5 may be disposed transversely of the vehicle above the windshield visor 6. The reflector 5 is slightly concave and returns the light rays when the oncoming vehicle has reached a predetermined distance in front. The concavity may be varied in accordance with the distance from the vehicle it is desired that the headlight rays be returned.

An alternate form is shown in Fig. 6 in which the reflecting surface 7 extends from one side to the other of the windshield 8. The surface 7 may be formed in any suitable manner, as above pointed out. If desired, the reflector may be colored in order to blend with the color of the vehicle in order to provide a pleasing appearance. Fig. 7 shows a laminated windshield 9 in which the reflecting surface 10 is formed between the laminations. This prevents the reflecting surface from being rubbed off or otherwise damaged.

The reflector 11 shown in Fig. 8 is similar to that shown in Fig. 4, except that it is a plain straight reflector.

In a broader aspect, it is evident that this invention provides a reflector which is positioned at such an angle that it will catch rays coming from a slight angle to one side or directly in front of the vehicle and return them substantially horizontally but in the same vertical plane.

It is to be understood that numerous changes in construction and arrangement may be effected by those skilled in this art without departing from the spirit of the invention.

What I claim is:

1. A vehicle having a wind shield and a reflecting surface mounted on the vehicle at approximately the height of the windshield, said reflecting surface being mounted at such an angle as to reflect rays coming from a lower point and approximately in line with the direction of movement of the vehicle into a substantially horizontal direction in approximately the same vertical plane as the oncoming rays.

2. A vehicle having a wind shield and a reflecting surface mounted on the vehicle at approximately the height of the windshield, said reflecting surface being mounted at such an angle that it will catch rays coming from a slight angle at one side or directly in front of the vehicle and return them substantially horizontally but in the same vertical plane.

In testimony whereof I have hereunto signed my name to this specification.

WILBUR F. BROWN.